June 1, 1926. 1,587,039
N. J. SAUVAGE
HAND BRAKE
Filed Jan. 29, 1923
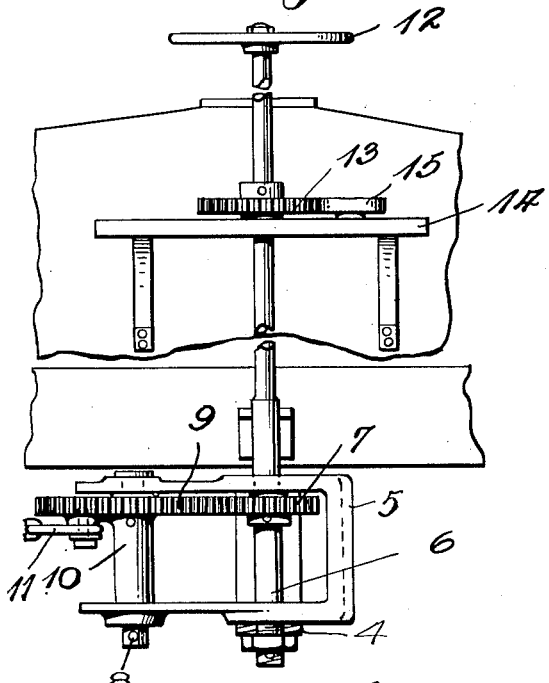
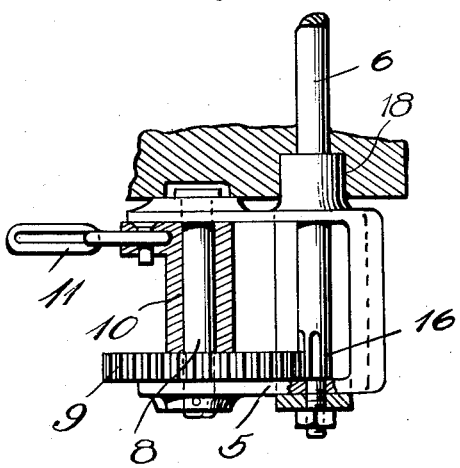
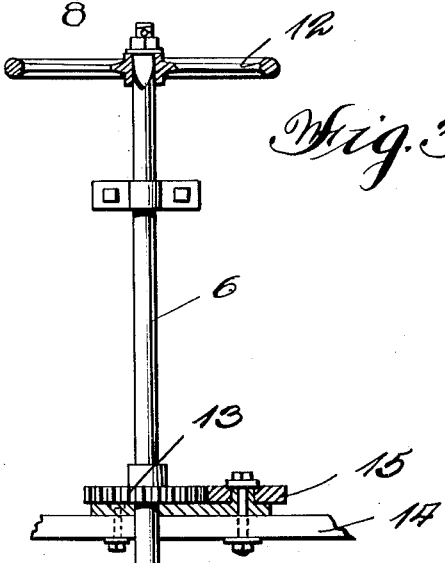
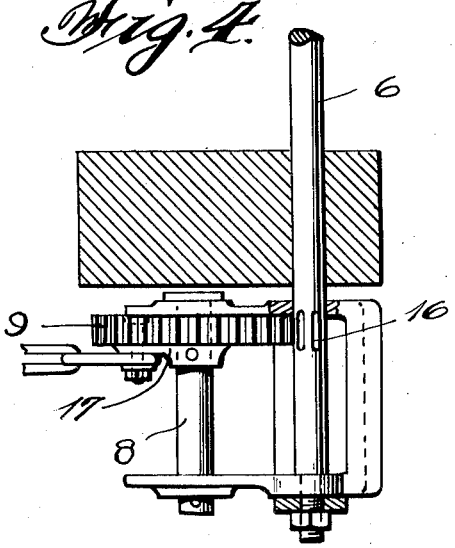
Inventor
N. J. Sauvage
By
Attorney

UNITED STATES PATENT OFFICE.

NORMAN J. SAUVAGE, OF NEW YORK, N. Y.

HAND BRAKE.

Application filed January 29, 1923. Serial No. 615,692.

This invention relates to improvements in manually operated brake apparatus for vehicles and cars, and more particularly to what is generally known as hand brakes.

One of the objects of the present invention is to provide an improved means for controlling the hand brakes on vehicles of all descriptions, which will be reliable and efficient in use and operation.

A further object is to provide a brake of the above general character, whereby the same braking power now obtained may be maintained with a minimum length of brake chain.

A further object is to provide a safe, simple and powerful hand brake with a special type of drum, whereby an increase in power and quick take-up of the drum chains may be obtained.

A further object is to provide a hand brake of the above general character in which the braking power is applied directly in line with the forces exerted by the brake chain.

A further object is to provide a hand brake of the above character having fewer parts which will not be likely to get out of order, and which may be more inexpensively and easily manufactured and assembled than those now in use.

The invention accordingly consists in the features of construction, the combination of parts, and in the unique relation of the various members and the relative proportioning and dispositioning thereof, all as more clearly outlined herein.

To enable others skilled in the art to fully comprehend the underlying features thereof, in order that they may embody the same, by numerous modifications in structure and relation contemplated by this invention, drawings depicting a preferred form of the invention have been annexed as part of this disclosure, and in such drawings like characters of reference indicate corresponding parts throughout all the views, of which—

Figure 1 is a view in elevation of my apparatus embodying one form of a preferred construction;

Figure 2 is an elevational view, showing a slight modification of the parts shown in Figure 1;

Figure 3 is an end view of the parts shown in Figure 1; and

Figure 4 is a view in elevation showing a further modification of the parts shown in Figure 1.

Referring now to the drawings in detail and more particularly to Figure 1, 5 represents a swivelling yoke of substantially U-shaped construction having a brake staff 6 journaled therein and passing therethrough from top to bottom. The yoke 5 is mounted in a step bracket 4 which is bolted to the floor or brake rigging of the car or vehicle and which acts as a bearing for the brake-staff 6. A pinion 7 may be mounted upon this brake staff, if so desired, and is preferably keyed or riveted thereto in any desired manner, whereby the two parts will rotate together. Positioned in suitable bearings within the yoke 5 is a second shaft 8 carrying a gear 9 and a gear drum 10, having an outwardly extending portion, upon which the brake chain 11 is adapted to be wound. This chain is preferably secured to the outwardly extending portion of the drum, whereby, on the first revolution of the drum, a relatively large part of the chain will be taken up, after which the chain winds more slowly on the reduced portion of the drum, but at much higher power. The upper portion of the brake staff 6 is provided with a hand wheel 12 and the usual foot ratchet wheel 13 resting just above the floor or step 14 of the vehicle and is adapted to be engaged, in the usual manner, by a pawl 15. It will thus be seen that upon turning the handles 12 a rotative movement is transmitted through the brake staff 6 and pinion 7 to the gear 9 and drum 10. The brake chain 11, being pivoted to the outwardly extending portion of the drum, is thereby given a relatively large take-up movement upon the first half revolution of the gear 9, after which the chain is wound on the drum of smaller diameter with a greatly increased power on applying the brakes. The swivelling yoke construction also permits the yoke to swivel in the line of forces exerted by the brake chain to the brake rigging underneath the vehicle or car which results in increased braking efficiency upon application of the brakes.

The construction shown in Figure 2 is substantially similar to that above described except that the yoke 5 is preferably in the form of a casting, and the pinion is integrally formed at the lower end of the brake staff to constitute therewith a steel pinion shaft, as at 16, the geared portion of the brake staff meshing directly with the gear 10 carried by the chain drum. An upraised shoulder 18 is provided on the yoke which enters a corresponding recessed portion of the brake beam or rigging and serves to form a bearing and support for the brake-staff and likewise provides a strengthened fulcrum about which the yoke 5 may swivel. As seen from the drawing, in this modification the gear 10 is positioned at the end of the drum opposite to the outwardly extending portion. In this way a lesser number of parts is required and greater power may be transmitted from the staff to the gear on the drum, due to the reduction in gear ratio.

Referring now to the construction shown in Figure 4, gear teeth 16 are cut in the brake staff 6 to mesh with the gear 9, as in Figure 2. This gear 9 has cast to its lower face a lug or thickened portion 17 to the outer portion of which the take up chain 11 is preferably attached and the chain is wound on the shaft 8. It is thus evident that this embodiment obviates the necessity of a brake drum, other than the shaft and results in an increased reduction of the number of operative parts.

The above described construction obviates the many serious disadvantages present in the existing types of hand brakes, which, briefly stated are: First, the brakes now in use on vehicles of all description depend to a large extent in getting their power from the brake staff through a pulley wheel and increasing levers beneath the car, in order to get sufficient braking power necessary for a loaded car. Second, these prior devices are more or less of a menace and fail to produce a sufficient braking to safeguard a loaded car, particularly in gravity or hump yards. The pulling and increasing power levers placed beneath the car produce such an enormous chain travel with a brake that is adjusted for an eight inch standard piston travel, that it is necessary to wrap up thirty-two to thirty-six inches of chain around the brake staff with the usual result of balling the chain into a knot or mass at its lower end. Under these conditions it is impossible to operate the same efficiently, and thereby from fifty to eighty percent of its rotated power is lost. The improved hand brake, in the present invention, may be geared to any desired ratio, but by reason of the quick take-up drum six to eight inches of chain are taken up on the first half revolution, and after the drum is geared the chain rotates on a smaller diameter. The drum can be made in any diameter desired, and the brake chain may be attached directly to the gear wheel. In any event, instead of wrapping up thirty-two to thirty-six inches of brake chain, with the present construction not over a third of this chain is required, and consequently balling up of the chain about the staff cannot occur. The swivelling yoke construction further insures the direct application of power in line with the forces exerted by the brake chain.

The novel and unique device is preferably loosely mounted on the brake staff and being simple, powerful and inexpensive can be applied to all existing brake staff cars without discarding any of the equipment now in use, unless, if preferred, that modification shown in Figures 2 and 4 is used in which an all steel, one-piece pinion staff is adopted.

In operation when the operator turns the hand brake wheel 12 and engages the foot pawl 15 with the ratchet 13 secured to the brake staff 6, it is unnecessary for the brakeman to use other means, such as a bar or pick handle, to secure some adequate holding power of the brakes which is undesirable in practice and even dangerous.

While I have described my invention in detail with respect to certain embodiments thereof, I do not desire to be limited to such details and embodiments, since many changes and modifications may be made and the improvements incorporated in widely different forms without departing from the spirit and scope of the invention in its broader aspect.

It is thus seen that the present invention provides a simple and practical mechanism adapted to accomplish, among others, all of the objects and advantages herein set forth.

Without further analysis the foregoing will so fully reveal the gist of this invention that others can, by applying current knowledge, readily adapt it for various applications without omitting certain features that from the standpoint of the prior art fairly constitute essential characteristics of the generic or specific aspects of this invention, and, therefore, such adaptations should and are intended to be comprehended within the meaning and range of equivalency of the following claims.

I claim:

1. The combination of a hand brake rigging, a swivelling yoke, a pinioned staff passing through said yoke, a geared drum mounted in said yoke for engagement with said staff and a brake chain mounted on said drum.

2. In a hand brake rigging, in combination, a hand brake staff with hand operating means, and having associated pinion teeth at its lower end, a geared drum meshing with said pinion staff, and a swivelling yoke supporting said geared drum for engagement with said staff and a brake chain on said drum.

3. In a hand brake rigging, in combination, a staff, provided with means for rotating the same, and pinioned at the lower end thereof, a yoke swivelled on said staff, a drum carried by said yoke, a gear associated with the drum meshing with the pinioned staff, and a chain connected with the brakes adapted to be wound on said drum, said drum having dissimilar effective radii.

4. In a hand brake rigging, in combination, a brake staff, a swivelling yoke associated therewith, a drum carried by the yoke, a chain adapted to be wound on the drum and means associated with the drum and staff whereby the drum is rotated on rotation of the staff.

5. In a hand brake rigging, in combination, a brake staff, a swivelling yoke associated therewith, a drum carried by the yoke, a chain adapted to be wound on the drum and means associated with the drum and staff whereby the drum is rotated on rotation of the staff, said means including intermeshing gears carried by the respective elements.

6. In a hand brake rigging, in combination, a brake staff, means for rotating the same, pawl and ratchet mechanism for holding the staff in its adjusted relative position, a yoke having a swivelling mounting on said staff, a wind-up drum loosely carried by said yoke, a chain adapted to be wound on said drum, and intermeshing gears associated with the staff and drum for causing rotation of the drum when said staff is rotated.

7. In a hand brake rigging, a brake staff, a yoke associated therewith, a brake chain having a connection with said yoke, means to wind the brake chain within said yoke upon rotation of said brake staff, said yoke being movable with relation to the brake staff, whereby the braking effort is applied in the direction of the force exerted by the brake chain.

In witness whereof I have hereunto signed my name this 17th day of January, 1923.

NORMAN J. SAUVAGE.